Oct. 2, 1962 D. E. THOMAS 3,056,924
NULL-TYPE TRANSISTOR BETA MEASURING SET
Filed July 17, 1959 2 Sheets-Sheet 1

$\alpha_o$ AND $\beta_o$ PLOTTED AS A FUNCTION OF COLLECTOR VOLTAGE

INVENTOR
D. E. THOMAS
BY R B Ardis
ATTORNEY

Oct. 2, 1962   D. E. THOMAS   3,056,924
NULL-TYPE TRANSISTOR BETA MEASURING SET
Filed July 17, 1959   2 Sheets-Sheet 2

INVENTOR
D. E. THOMAS
BY R B Ardin
ATTORNEY

United States Patent Office 3,056,924
Patented Oct. 2, 1962

3,056,924
NULL-TYPE TRANSISTOR BETA
MEASURING SET
Donald E. Thomas, Madison, N.J., assignor to Bell Telephone Laboratories, Incorporated, New York, N.Y., a corporation of New York
Filed July 17, 1959, Ser. No. 827,837
8 Claims. (Cl. 324—158)

This invention relates generally to the measurement of electrical operating parameters of transistors and more particularly to the measurement of the so-called common-emitter current amplification factor, beta.

A principal object of the invention is to increase the accuracy of transistor beta measuring sets.

Another and more particular object is to free the accuracy of transistor beta measurements from dependence upon the accuracy with which the magnitude of a current or a voltage can be determined by a meter reading.

Still another object is to permit the common-emitter current amplification factor, beta, of transistors to be measured more accurately than it can be computed from measured values of the common-base current amplification factor, alpha.

In the fundamental study of the current amplification characteristics of transistors, attention is usually directed to the common-base current amplification factor, alpha, which is defined as the ratio of collector current to emitter current while the collector is shorted to the base. Of more interest to the circuit designer concerned primarily with common-emitter transistor circuits, however, is the common-emitter amplification factor beta, which is defined as the ratio of collector current to base current while the collector is shorted to the emitter. In the past, beta has usually either been computed from measured values of alpha by the formula $$\beta = \frac{\alpha}{1-\alpha}$$

or been determined by instruments which measure the ratio of the voltage across a standard resistance in the collector circuit to the voltage across a standard resistance in the base circuit. The former technique, however, is inherently inaccurate in that relatively small errors in the value of alpha are reflected as much greater percentage errors in the computed value of beta. The latter technique involves the use of sensitive voltmeters and depends for its accuracy upon extreme constancy of signaling level and upon the accuracy with which the meters can be read.

The present invention overcomes these limitations of the prior art and takes the form, in general, of a direct-reading null-type transistor beta measuring set, the accuracy of which is substantially independent of the signal level. In accordance with a principal feature of the invention, a variable resistor and a fixed resistor are connected in series between the base and collector electrodes of the transistor to be tested, with the variable resistor electrically nearer the base, a signal generator is connected in series with the variable resistor in a path between the emitter electrode of the transistor and the junction between the variable and fixed resistors, and a null-reading voltage measuring device is connected between the transistor base and collector electrodes substantially in parallel with the series combination of the variable and fixed resistors. When the variable resistor is adjusted to give a null reading on the voltage measuring device, beta is given simply by the ratio of the resistance of the variable resistor to that of the fixed resistor. Since the voltage measuring device is used only to provide a null reading, measuring accuracy is freed from dependence upon the accuracy with which a meter can be read. The variable resistor in the collector-base path of the transistor, which provides the desired beta reading, is capable of being calibrated with much greater precision than a meter and, furthermore, remains calibrated once it has been calibrated. Signal level fluctuations fail to affect the accuracy of the measurement, since the resistance value of the variable resistor for a null balance is independent of signal level over a considerable range of signal levels.

Successful use of null techniques to measure transistor alpha is shown by the measuring set disclosed and claimed in the present inventor's Patent 2,847,645, which issued August 12, 1958. If the values of alpha obtained from such a set are used to calculate corresponding values of beta, however, there remains the above-mentioned difficulty that even small percentage errors in the measured values of alpha are reflected as much greater percentage errors in the computed values of beta. The present invention permits beta to be measured directly with a precision comparable to that obtained in the measurement of alpha with the apparatus of the above-identified patent.

A more complete understanding of the invention may be obtained from a study of the following detailed description of several specific embodiments. In the drawings.

Figure 1:
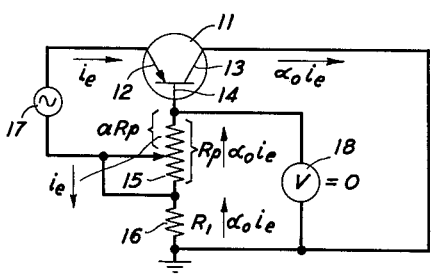
FIG. 1 illustrates the basic alternating-current transistor beta measuring circuit featured by the present invention.

The embodiment of the invention illustrated in FIG. 1 includes a junction transistor 11 having an emitter electrode 12, a collector electrode 13, and a base electrode 14. In the conventional transistor symbol shown, emitter electrode 12 is indicated by the arrowhead and the direction of positive emitter current flow is indicated by the direction of the arrow. Thus, a transistor of the p-n-p type is indicated by an emitter arrow pointing toward the base while a transistor of the n-p-n type is indicated by an emitter arrow pointing away from the base. The transistors shown in this and succeeding figures are p-n-p transistors, but it should be understood that the invention is applicable to the measurement of the betas of transistors of the opposite conductivity type as well. For transistors of the n-p-n type, currents flow in directions opposite to those shown in the drawings and all direct-current bias supply potentials should be reversed.

The circuitry in the embodiment of the invention shown in FIG. 1 omits provision for direct-current biasing for the sake of simplicity. As shown, the circuit includes, in addition to transistor 11, a potentiometer 15, a fixed resistor 16, a signal generator 17, and a voltmeter 18. The resistance arm of potentiometer 15 has a total resistance $R_p$, while fixed resistor 16 has a resistance $R_1$. The resistance arm of potentiometer 15 and fixed resistor 16 are connected in series between base electrode 14 of transistor 11 and ground. Collector electrode 13 of transistor 11 is connected to ground for purposes of alternating current, and signal generator 17 is connected between emitter electrode 12 of transistor 11 and the movable contact of potentiometer 15. The movable contact of potentiometer 15 is also shorted to the junction between the resistance arm of potentiometer 15 and fixed resistor 16.

The short from the movable contact of potentiometer 15 to the junction between the resistance arm and fixed resistor 16 converts potentiometer 15 into a variable resistor. It is principally in this respect, plus the presence of fixed resistor 16, that the embodiment of the invention shown in FIG. 1 differs from the alpha measuring sets shown in applicant's prior Patent 2,847,645. The difference, moreover is vital, as it permits the present circuit to be direct reading in beta. The resistance of the resistance arm of potentiometer 15 is linearly variable between the movable contact and base electrode 14 of transistor 11 and has a value designated in FIG. 1 as $aR_p$, where $a$ varies linearly from zero to unity. The combined series resistance of potentiometer 15 and fixed resistor 16 is kept small in comparison with the internal collector impedance of transistor 11.

In the embodiment of the invention shown in FIG. 1, a small-signal low-frequency current $i_e$ is supplied to emitter electrode 12 of transistor 11 from signal generator 17. This current is returned to signal generator 17 through base electrode 14 of transistor 11 and the movable contact of potentiometer 15. Since collector electrode 13 is effectively shorted to base electrode 14 because of the relatively low series resistance of potentiometer 15 and fixed resistor 16, the collector current is approximately $\alpha_0 i_e$, where $\alpha_0$ is the low-frequency common base current amplification factor of transistor 11. This current flows back into base electrode 14, as shown in FIG. 1 through, fixed resistor 16 and the resistance arm of potentiometer 15.

When the movable contact of potentiometer 15 is adjusted so that a null reading is obtained on voltmeter 18, the following equation holds for transistors whose values of $\alpha_0$ are less than unity:

$$aR_p(1-\alpha_0)i_e - R_1\alpha_0 i_e = 0 \quad (1)$$

Equation 1 readily resolves to $$\frac{\alpha_0}{1-\alpha_0} = \frac{aR_p}{R_1} \quad (2)$$

which is the low-frequency common-emitter current amplification factor $\beta_0$. When a null reading is obtained on voltmeter 18, in other words, $\beta_0$ is equal to the ratio of the resistance of the variable resistor formed by potentiometer 15 to that of fixed resistor 16.

To make the circuit direct reading in beta, the linearly variable resistance $aR_p$ is calibrated in terms of a linear scale of $n$ divisions. This scale reads zero when the variable resistance $aR_p$ is zero and $n$ when the variable resistance is the maximum value $R_p$. Then, if $n_0$ is the reading when the alternating voltage between base electrode 14 and ground is zero, $$a = \frac{n_0}{n} \quad (3)$$

and $$\beta_0 = \frac{n_0 R_p}{n R_1} \quad (4)$$

With a proper choice of $R_p$, $R_1$, and $n$, $\beta_0$ can then be made direct reading in $n_0$. By way of example, if $n$ is $10^b$ and the ratio of $R_p$ to $R_1$ is $10^c$, $$\beta_0 = n_0 \frac{10^c}{10^b} = n_0 \times 10^{(c-b)} \quad (5)$$

and $\beta_0$ is direct reading in $n_0$ except for the location of the decimal point. Proper calibration of the $n$ scale will, of course, make it exactly direct reading. However, since multiple scales are generally desired and the positioning of the decimal point is an easy matter, a numerical rather than an exact reading of $\beta_0$ is normally preferred.

Figure 2:
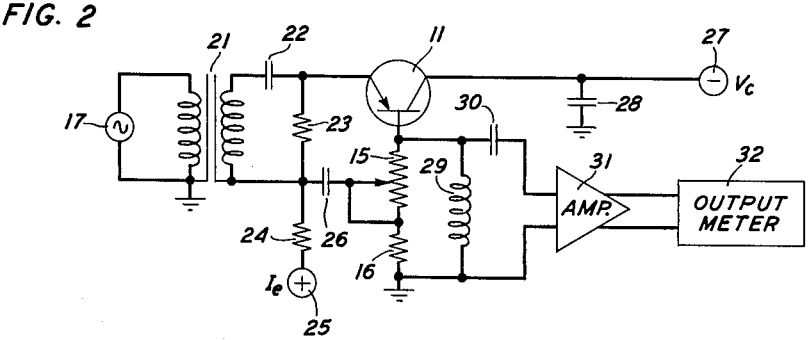
FIG. 2 shows a more complete version of the embodiment of the invention illustrated in FIG. 1.

FIG. 2 illustrates a more complete version of the null-type transistor beta measuring set shown in FIG. 1. As in FIG. 1, fixed resistor 16 and the resistance arm of potentiometer 15 are connected in series between the base electrode of transistor 11 and ground. Also as before, the movable contact of potentiometer 15 is shorted to the junction between potentiometer 15 and fixed resistor 16. Instead of being coupled directly to the emitter electrode of transistor 11 in FIG. 2, however, signal generator 17 is coupled to that point through a double-shielded transformer 21 in order to attenuate currents which might otherwise flow to ground through fixed resistor 16 and cause a false null-balance and an error in the measurement. The frequency of the measurement signal supplied by signal generator 17, may by way of example, be 1000 cycles. A blocking capacitor 22 is connected between the secondary winding of transformer 21 and the emitter electrode of transistor 11 to keep direct emitter current out of the former. The direct-current path to the emitter is completed by a pair of resistors 23 and 24 connected in series between the emitter and a source of positive potential 25. Of these resistors, the former resistor 23 shunts the series combination of the secondary winding of transformer 21 and blocking capacitor 22. The resistance of resistor 24 is very large in comparison with that of fixed resistor 16 in order to avoid shunting effects. As an alternative, the parallel resistance of resistors 16 and 24 may be relied upon to provide the resistance $R_1$. The alternating-current path to the emitter through the latter elements is completed by a blocking capacitor 26 connected from the junction of resistors 23 and 24 to the movable contact of potentiometer 15.

Emitter biasing current in the embodiment of the invention shown in FIG. 2 is provided by positive potential source 25. The emitter-base junction of transistor 11 is thereby given a forward bias. A reverse bias on the collector-base junction is provided by a negative voltage source 27 to which the collector electrode of transistor 11 is connected. A low-impedance alternating-current path from the collector electrode of transistor 11 to ground is provided by a bypass capacitor 28.

Finally, the null-reading measuring circuitry of FIG. 1 is replaced in FIG. 2 by an inductor 29, a blocking capacitor 30, a high-gain amplifier 31 tuned to the frequency of signal generator 17, and an indicating meter 32. Inductor 29 is connected in shunt with the series combination of potentiometer 15 and fixed resistor 16 to provide a low resistance direct-current path to ground from the base electrode of transistor 11. The direct voltage from the collector electrode of transistor 11 to ground is thereby made substantially equal to the collector-to-base voltage. Blocking capacitor 30 is connected in series between the base electrode of transistor 11 and amplifier 31 to keep direct currents out of the measuring circuitry.

Figure 3:
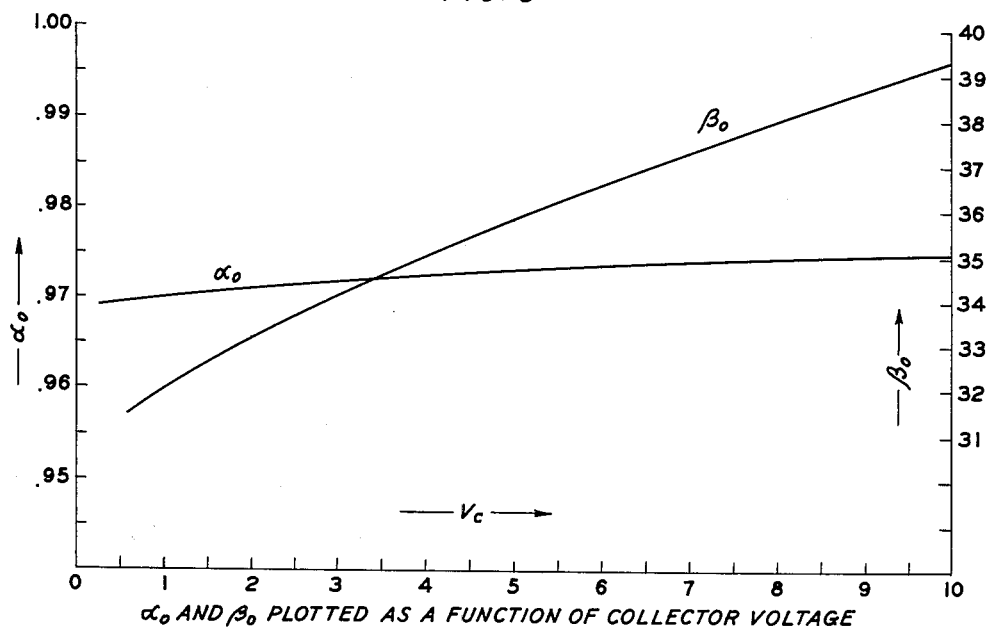
FIG. 3 is a graph showing the manner in which low frequency alpha and beta vary with collector voltage in a representative transistor.

The importance of the direct reading transistor beta measuring set provided by the present invention is demonstrated by the curves plotted in FIG. 3. There, both $\alpha_0$ and $\beta_0$ for a transistor having a particularly flat $\alpha_0$ characteristic are plotted against collector voltage $V_c$. The $\alpha_0$ curve was taken with a null-type alpha measuring set like the one shown in FIG. 3 of applicant's prior Patent 2,847,645, while the $\beta_0$ curve was taken with a beta measuring set embodying the present invention. As shown, very small percentage variations in $\alpha_0$ are accompanied by much larger percentage variations in $\beta_0$. For this reason, if even a small error were to be made in an alpha reading, any beta value calculated from that reading might be considerably in error. The present invention permits beta to be read directly from a simple measuring set with the same high degree of accuracy as alpha.

Figure 4:
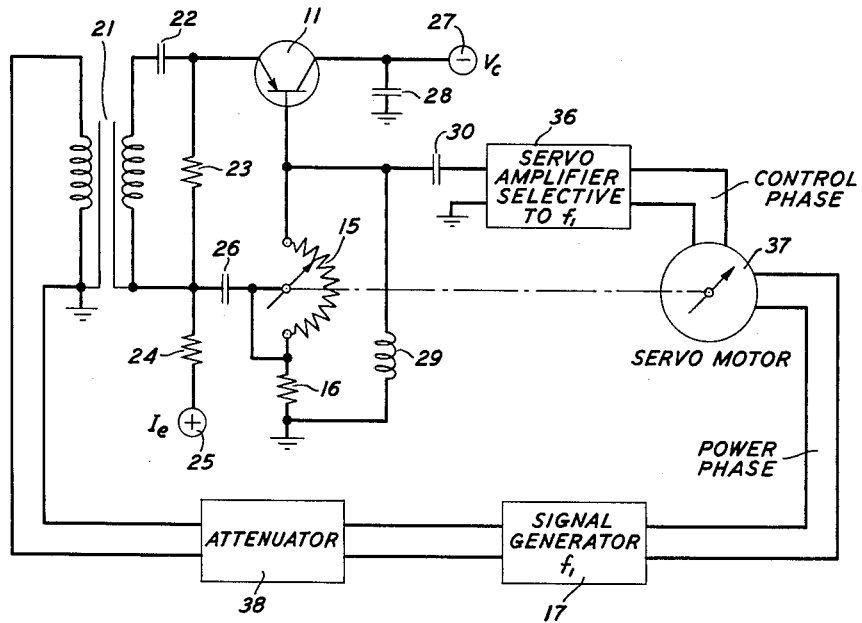
FIG. 4 illustrates an embodiment of the invention adapted for automatic operation.

An embodiment of the invention in which servo techniques are used to provide an automatic null reading is illustrated in FIG. 4. The automatic beta measuring set shown in FIG. 4 is substantially identical to the circuit of FIG. 2 except that amplifier 31 and output meter 32 are replaced by a servo power amplifier 36 and a two-phase alternating-current servo motor 37 and, signal generator 17 is used to supply power to servo motor 37 as well as a measuring signal to transistor 11. As indicated in the drawing, amplifier 36 is selective to the signal generator frequency and supplies the control phase of servo motor 37. The reference or power phase of servo motor 37 is supplied directly from signal generator 17. Since the amount of power required to operate servo motor 37 is considerably greater than that used to provide a signal at the transistor emitter electrode, an attenuator 38 is connected between signal generator 17 and the primary winding of transformer 21.

In the embodiment of the invention illustrated in FIG. 4, the shaft of servo motor 37 is angle-position-coupled to the shaft of balancing potentiometer 15 of the measuring circuit. A signal at the input of servo amplifier 36 drives servo motor 37 until that signal becomes zero. This action balances potentiometer 15 and gives an automatic indication of the common-emitter transistor amplification factor beta in terms of the potentiometer setting. The circuit can, of course, be readily adapted to additional automatic operation in the manner disclosed for the alpha measuring set in applicant's prior Patent 2,847,645.

Figure 5:
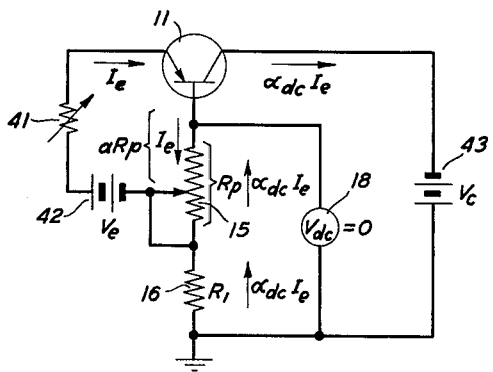
FIG. 5 shows a direct-current transistor beta measuring circuit embodying features of the invention.

The present invention can, of course, also be adapted to measure direct-current beta, which is defined as the ratio of the total direct collector current to the total direct base current when the direct-current resistance between emitter and collector is small in comparison with the internal collector impedance of the transistor. An embodiment so adapted is shown in FIG. 5, where the base electrode of transistor 11 is returned to ground through the series combination of the resistance arm of potentiometer 15 and a fixed resistor 16 as before. In addition, a direct-current voltmeter 18 is connected directly in parallel with potentiometer 15 and fixed resistor 16. The movable contact of potentiometer 15 is shorted to the top of fixed resistor 16. The remainder of the circuit is made up of a resistor 41 and an emitter biasing battery 42 connected in series between the emitter electrode of transistor 11 and the movable contact of potentiometer 15 and by a collector biasing battery 43 connected between the collector electrode of transistor 11 and ground. Emitter battery 42 is poled to provide a forward bias on the emitter-base junction of transistor 11, while collector battery 43 is poled to provide a reverse bias on the collector-base junction.

The conditions for balance are substantially the same in FIG. 5 as in FIG. 1. In FIG. 5, $I_e$ designates the total direct emitter current flowing in transistor 11, and $\alpha_{dc}$ designates the common-base current amplification factor at zero frequency. When $V_{dc}$, the direct potential between the base electrode of transistor 11 and ground, is made zero, then $$\beta_{dc} = \frac{aR_p}{R_1} \quad (6)$$

which is similar to Equation 2. The embodiment of the invention shown in FIG. 5 can be adapted for automatic reading with the aid of servo techniques in much the same manner as the alternating-current sets which have already been described.

It is to be understood that the above-described arrangements are illustrative of the application of the principles of the invention. Numerous other arrangements may be devised by those skilled in the art without departing from the spirit and scope of the invention.

What is claimed is:

1. In combination with a transistor having an emitter electrode, a collector electrode, and a base electrode, measuring apparatus which comprises means to supply direct operating potentials to said electrodes, a variable resistor and a fixed resistor connected in series between a pair of said electrodes, an input signal source connected between the remaining one of said electrodes and the junction between said variable and fixed resistors, and null-reading voltage measuring means connected substantially in parallel with the series combination of said variable and fixed resistors.

2. In combination with a transistor having an emitter electrode, a collector electrode, a base electrode, and a common-base current amplification factor less than unity, an arrangement for measuring the common-emitter current amplification factor of said transistor which comprises means to supply direct operating potentials to said electrodes, a variable resistor and a fixed resistor connected in series between said base and collector electrodes, an input signal source connected between said emitter electrode and the junction between said variable and fixed resistors, and null-reading voltage measuring means connected between said base and collector electrodes substantially in parallel with the series combination of said variable and fixed resistors.

3. A combination in accordance with claim 2 in which the combined series resistance of said variable and fixed resistors is at least several times smaller than the internal collector impedance of said transistor.

4. In combination with a transistor having an emitter electrode, a collector electrode, a base electrode, and a common-base current amplification factor less than unity, an arrangement for measuring the common-emitter current amplification factor of said transistor which comprises means to bias said emitter electrode in the forward direction, means to bias said collector electrode in the reverse direction, a substantially linearly variable resistor and a fixed resistor connected in series between said base and collector electrodes with said variable resistor electrically nearer said base electrode, an input signal source connected between said emitter electrode and the junction of said variable and fixed resistors, and null-reading voltage measuring means connected substantially in parallel with the series combination of said variable and fixed resistors, whereby the common-emitter current amplification factor of said transistor is proportional to the resistance magnitude of said variable resistor at which said voltage measuring means indicates a null.

5. In combination with a transistor having an emitter electrode, a collector electrode, a base electrode, and a common-base current amplification factor less than unity, an arrangement for measuring the common-emitter current amplification factor of said transistor which comprises means to bias said emitter electrode in the forward direction, means to bias said collector electrode in the reverse direction, a potentiometer having a resistance arm and a movable contact thereon, a fixed resistor, circuit means connecting said resistance arm and said fixed resistor in series between said base and collector electrodes with said resistance arm electrically nearer said base electrode, circuit means shorting said movable contact to the end of said resistance arm electrically nearer said fixed resistor, an input signal source connected between said emitter electrode and said movable contact, and null-reading voltage measuring means connected between said base and collector electrodes substantially in parallel with the series combination of said resistance arm and said fixed resistor, whereby the common-emitter current amplification factor of said transistor is represented by the position of said movable contact on said resistance arm at which a null indication is obtained on said voltage measuring means.

6. A combination in accordance with claim 5 in which the combined series resistance of said resistance arm and said fixed resistor is at least several times smaller than the internal collector impedance of said transistor.

7. In combination with a transistor having an emitter electrode, a collector electrode, a base electrode, and a common-base current amplification factor less than unity, an arangement for measuring the common-emitter current amplification factor of said transistor which comprises means to bias said emitter electrode in the forward direction, means to bias said collector electrode in the reverse direction, a potentiometer having a resistance arm and a movable contact thereon, a fixed resistor, circuit means connecting said resistance arm and said fixed resistor in series between said base and collector electrodes with said resistance arm electrically nearer said base electrode, circuit means shorting said movable contact to the end of said resistance arm electrically nearer said fixed resistor, an alternating-current signal generator, an alternating-current servo motor having a reference phase, a control phase, and a shaft position-coupled to said movable contact, means connecting the reference phase of said servo motor to said signal generator, means connecting the control phase of said servo motor across the series combination of said resistance arm and said fixed resistor, and means connecting said signal generator between said emitter electrode and said movable contact, whereby the common-emitter current amplification factor of said transistor is represented by the position of said movable contact on said resistance arm when said servo motor comes to rest.

8. A combination in accordance with claim 7 in which the combined series resistance of said resistance arm and said fixed resistor is at least several times less than the internal collector impedance of said transistor.

References Cited in the file of this patent

UNITED STATES PATENTS

| | | |
|---|---|---|
| 2,847,645 | Thomas | Aug. 12, 1958 |
| 2,946,008 | Kallmann | July 19, 1960 |

OTHER REFERENCES

Principles of Transistor Circuits, R. F. Shea, copyright 1953 by John Wiley and Sons, Inc.; pages 485–500 relied upon.

Transistor Circuit Handbook, by Louis Garner, Jr., published by Coyne Electrical School, pages 113–115 relied upon; copyright 1956.